United States Patent [19]

Kuper et al.

[11] Patent Number: 4,858,242
[45] Date of Patent: * Aug. 15, 1989

[54] UNITARY SOLID-STATE LASER

[75] Inventors: Jerry W. Kuper, Martinsville; William E. Langert, Budd Lake; Joseph J. Barrett, Morris Plains, all of N.J.

[73] Assignee: Allied-Signal Inc., Morris Township, Morris County, N.J.

[*] Notice: The portion of the term of this patent subsequent to Mar. 29, 2005 has been disclaimed.

[21] Appl. No.: 212,356

[22] Filed: Jun. 27, 1988

[51] Int. Cl.$^4$ .............................................. H01S 3/093
[52] U.S. Cl. ........................................ 372/72; 372/34
[58] Field of Search ................................... 372/34–36, 372/72, 69, 70

[56] References Cited

U.S. PATENT DOCUMENTS

| 3,356,966 | 12/1967 | Miller | 372/35 |
| 3,455,666 | 7/1969 | Bazinet, Jr. | 372/72 |
| 3,487,330 | 12/1969 | Gudmundsen | 372/35 |
| 3,500,238 | 3/1970 | Bazinet, Jr. et al. | 372/40 |
| 3,528,030 | 9/1970 | Bickel et al. | 372/72 |
| 3,611,189 | 10/1971 | Stone et al. | 372/35 |
| 3,626,319 | 12/1971 | Gilbert | 372/40 |
| 3,805,186 | 4/1974 | Woodcock | 372/34 |
| 4,096,450 | 6/1978 | Hill et al. | 372/34 |
| 4,170,763 | 10/1979 | Radecki et al. | 372/72 |
| 4,199,735 | 4/1980 | Chadwick et al. | 372/33 |
| 4,429,394 | 1/1984 | Guch, Jr. | 372/34 |
| 4,601,038 | 7/1986 | Guch, Jr. | 372/34 |
| 4,637,028 | 1/1987 | Kahan | 372/34 |
| 4,734,913 | 3/1988 | Morris et al. | 372/34 |

FOREIGN PATENT DOCUMENTS 8601344  2/1986  PCT Int'l Appl. ................... 372/35

OTHER PUBLICATIONS

S. Guch, Jr. et al., "Alexandrite–Laser Performance at High Temperature" Dated Dec, 1982, Optics Letters/vol. 7, No. 12, p. 608.

Primary Examiner—William L. Sikes
Assistant Examiner—B. R. R. Holloway
Attorney, Agent, or Firm—Gerhard H. Fuchs

[57] ABSTRACT

Improvement in a laser having a solid transparent housing with two cavities for respectively holding a laser rod and a pump lamp. The rod is embedded along its total length within the housing; the pump lamp is embedded along its total arc and over a substantial length of each of its electrode regions within the housing. clearance between lamp envelope and housing is held to close tolerances. Optional beam tubes provided at the end of the rod at the housing shield the laser beam from thermal distortion. Flashlamps having a cerium-doped quartz envelope are particularly desirable for pumping this laser.

10 Claims, 6 Drawing Sheets

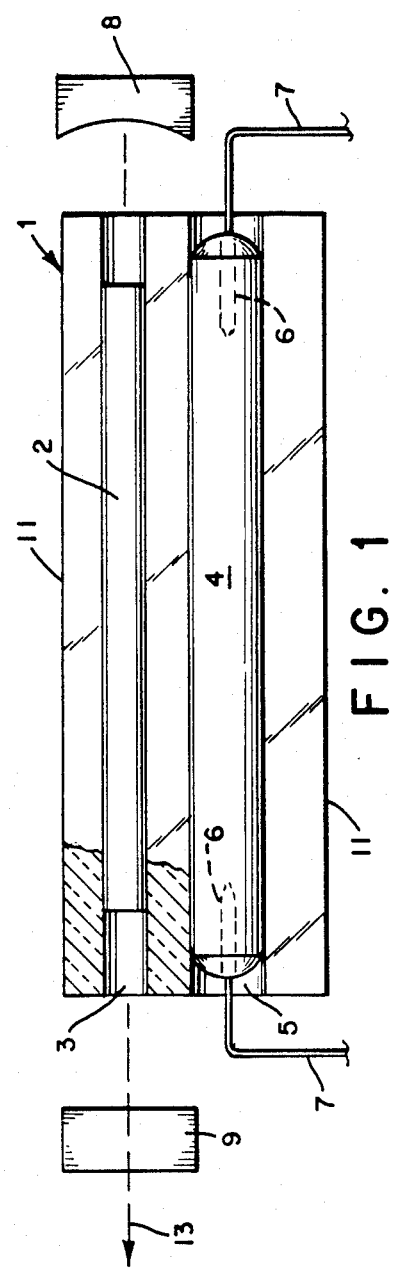
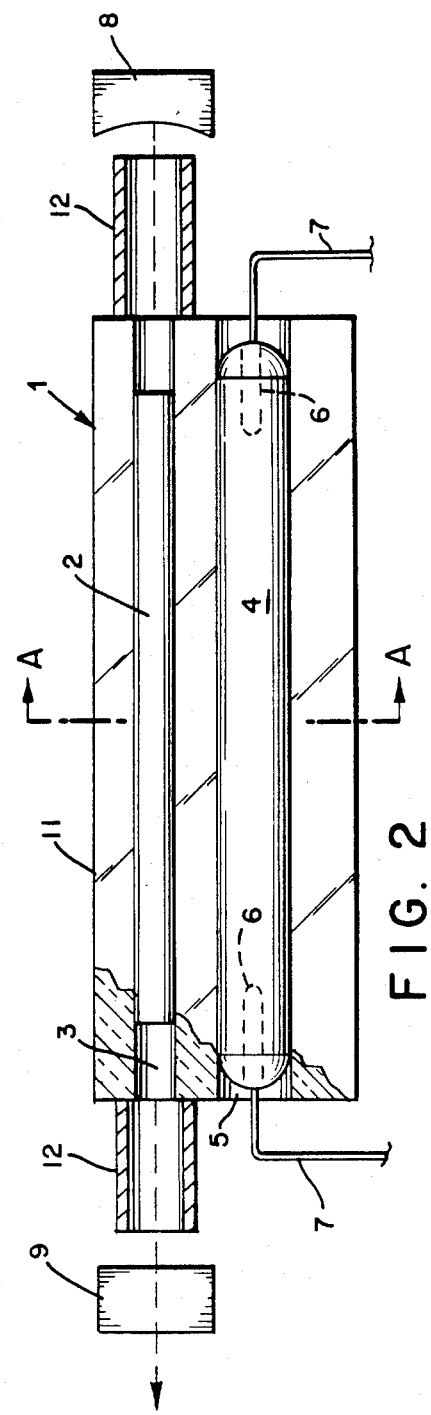

b > a

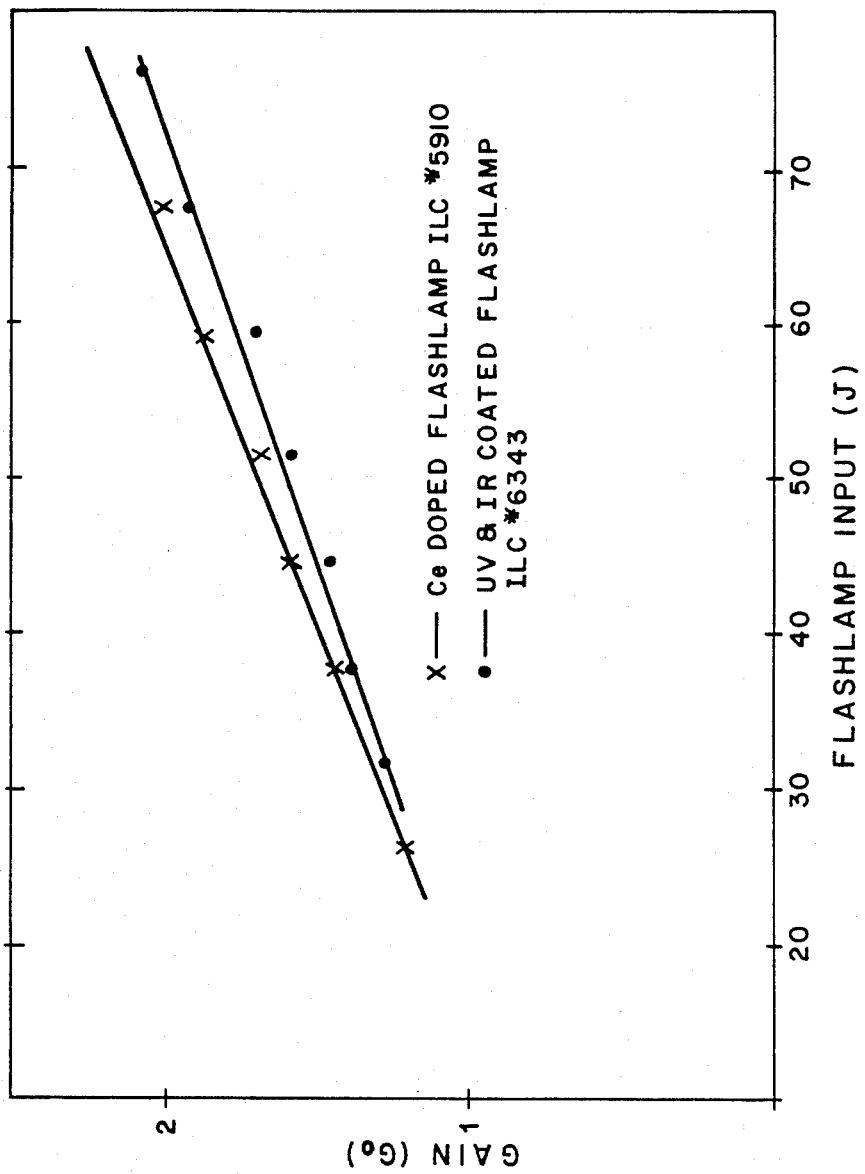

under the name "UNITARY SOLID-STATE LASER"

BACKGROUND OF THE INVENTION

1. Field of the Invention

This invention relates to improvements in an optically-pumped solid-state laser whose laser medium and pump lamp are both embedded in a transparent solid housing. The improvements enhance lasing performance.

2. Description of the Prior Art

The present invention provides improvements on the unitary solid state laser described in U.S. Pat. No. 4,734,913 issued Mar. 29, 1988 to Morris et al. for "Unitary Solid State Laser". As a result of these improvements, the unitary solid state laser of Morris et al., modified as described herein, can be operated more reliably, at higher power levels, and at higher repetition rates.

SUMMARY OF THE INVENTION

The improved unitary laser of the present invention comprises, in combination, (a) a transparent, thermally conductive solid housing comprising a pair of semi-cylindrical sections joined at one surface to be movable between a first open position and a second closed position;

(b) a laser medium that has two opposite ends and is embedded over its total length in a first cavity in the housing which is defined by the housing, when the housing is in the second, closed position;

(c) a pump lamp for exciting the laser medium having an envelope and internal electrodes which pump lamp is embedded over the whole length of its arc and over a substantial length of each of its electrode regions in a second cavity in the housing, such that the external surface of the flashlamp and the internal surface of the second cavity are mated with a clearance there between of not more than about 0.08 millimeters; and (d) reflector means adjacent to the opposite ends of the laser medium that define an optical resonant cavity and support coherent radiation laser emitted by the laser medium.

Preferably, the laser medium is alexandrite or emerald. Other solid state laser materials may be used. In some specific applications, this arrangement would be desirable for use with Nd:YAG. Other examplary materials with which the invention could be practiced include $Cr:ScBO_3$, $Cr:Gd_3Sc_2Ga_3O_{12}$, $Ti:BeAl_2O_4$, $Nd:Cr:Gd_3Sc_2Ga_3O_{12}$, $Cr:SrAlF_5$ and $Cr:KZnF_3$.

Desirably, the improved unitary solid state laser of the present invention further provides beam tubes surrounding the laser beam emanating from the ends of the laser medium, to shield the beam from thermal air gradients in the laser beam path. Addition of these beam tubes reduces fluctuations in the laser pulse energy and improves the overall stability of the laser.

The flashlamp desirably, though not necessarily, has an envelope of cerium doped fused quartz.

The laser medium may have any suitable shape e.g., rod, slab, and the like. For convenience, we refer to the medium, however configured, as a "rod".

BRIEF DESCRIPTION OF THE DRAWINGS

The annexed drawings, wherein like reference numerals denote like parts, illustrate and further explain the invention.

FIG. 1 is a sideview in partial cross-section of the improved laser of the present invention;

FIG. 2 is a sideview of the apparatus shown in FIG. 1 additionally equipped with beam tubes;

FIG. 7 shows the comparative gain of an alexandrite laser in an air cooled sapphire pump chamber, using the type of flashlamps employed in FIG. 6.

Figure 3:
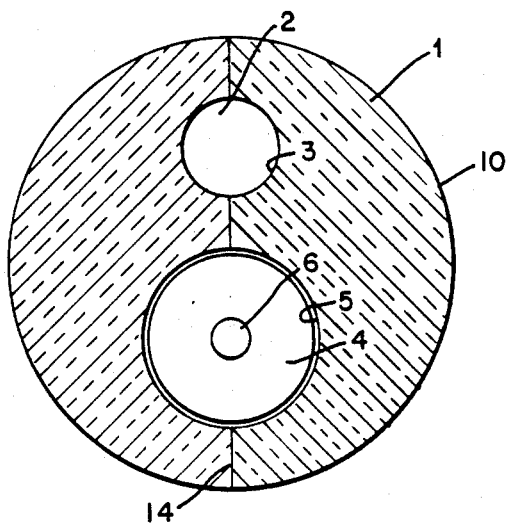
FIG. 3 is a cross-sectional view of the apparatus of FIG. 2 in the direction of A—A in FIG. 2.

DETAILED DESCRIPTION OF THE INVENTION OF THE PREFERRED EMBODIMENTS AND OF THE BEST MODE PRESENTLY CONTEMPLATED FOR ITS PRACTICE

The present invention provides improvements in a solid-state laser of unitary structure wherein the elements of the pump chamber, laser medium, pump lamp, and optical resonator are constructed as a unit. As a result of unitary construction, the laser is simple, compact and rugged. The improvements of the present invention make possible the operation of such unitary laser with greater reliability at higher power levels and at higher repetition rates.

The construction of the pump chamber is shown in FIG. 1. Embedded in transparent housing 1 is laser rod 2 and pump lamp 4. Total reflector 8 and partial reflector (output coupler) 9 are positioned along the axis of laser rod 2. Lasing action responsive to pumping by pump lamp 4 is evidenced by emission of coherent radiation 13. The transparent housing 1 is desirably constructed of sapphire. Its exterior may optionally be coated with a reflective coating 11 which may, for example, be a silver coating or a silver foil cover. Pump lamp 4 located in pump lamp bore 5 has internal electrodes 6 which are connected to electrical leads 7. As illustrated in FIG. 1, pump lamp 4, including the portions containing electodes 6, is totally enclosed within pump lamp bore 5. Also, laser rod 2 is, along its total length, enclosed within laser rod bore 3. Extension of transparent housing 4 to completely cover the length of laser rod 2 and of pump lamp 4, including the portions containing electrodes 6, provides for efficient cooling of the flashlamp electrodes 6 and in reduced optical distortion of the laser rod 2 due to thermal gradients. A substantial decrease in optical wedge has been observed for laser rods operated while totally enclosed within the bore of a sapphire transparent housing, as above described. However, it is not always necessary to enclose the total length of the flashlamp within pump lamp bore 5 in order to obtain the benefit of improved cooling and concomitant reduction in optical distortion. Generally, it will only be necessary that the pump lamp is so enclosed or embedded over the whole length of its arc and, additionally, over a substantial length of each of its electrode regions. By "substantial length" we mean at least about one quarter (25%) of the length of the electrode region, preferably, at least about one half (50%), more preferably yet at least about three quarters (75%) of the length of each of the electrode regions. While optimum results are obtained when the electrode regions are totally enclosed within the pump lamp bore, such is not always possible because of the construction of the flashlamp and of the metal connections for the electrodes which are passed through the envelope at the terminal portions thereof. That construction often does not practically permit precision grinding of the envelope over its total length, to the very ends where the electrical leads are connected. Nevertheless, lesser degrees of coverage, within the limits herein contemplated, give excellent results.

Figure 3A:
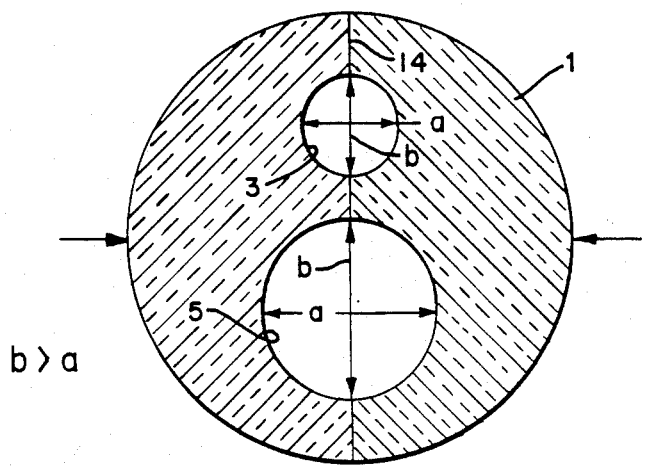
FIG. 3(a) is a schematic of the cross-sectional view of FIG. 3 indicating clearances between pump lamp and housing.
Figure 4:
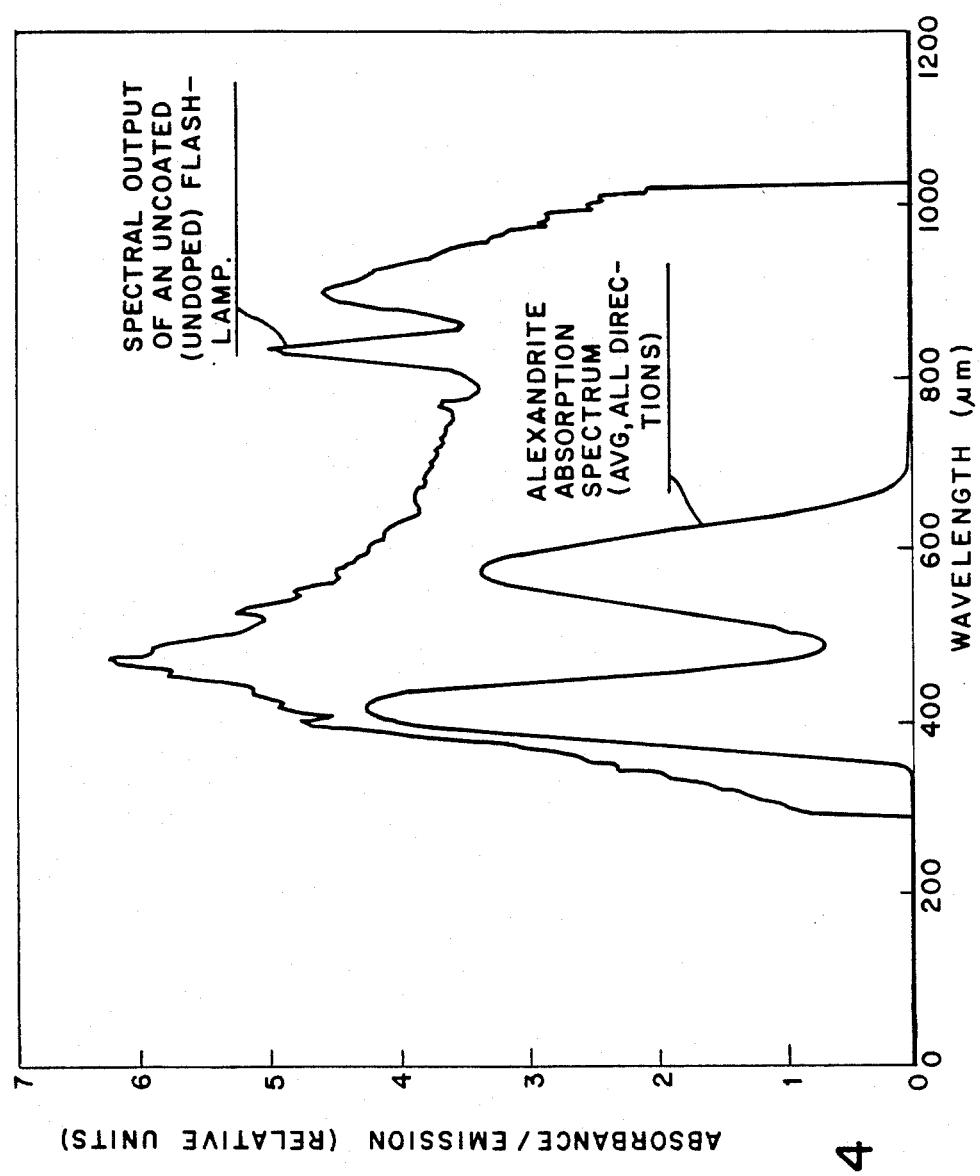
FIG. 4 shows superimposed the alexandrite absorption spectrum and the spectral output of an undoped, uncoated flashlamp.

With the reference to FIG. 3, pump lamp 4, located within the bore therefore provided in transparent housing 1, has a precision ground exterior such that, desirably, its diameter varies no more than about ±0.02 mm along its length and is of accordingly high degree of roundness. Further, the fit between pump lamp bore 5 and the precision ground exterior of pump lamp 4 is such as to provide a clearance there between at any place along its length and around its circumference of not more than about 0.1 mm, more desirably, not more than 0.05 mm, preferably not more than about 0.02 mm. In a particularly desirable embodiment, as schematically illustrated in FIG. 3a, the two halves 1a and 1b of housing 1 as shown in FIG. 3 are very slightly machined down at split 14, such that pump lamp bore 5 and, desirably, rod bore 3 are somewhat larger when measured in direction "b" than measured in direction "a" (see FIG. 3a). After insertion of laser rod 2 and pump lamp 4, the halves of housing 1 are biased toward each other, as by spring means or equivalent. This will insure line contact of the laser rod 2 and of the pump lamp 4 along their length with the side walls of their respective bores, while maintaining maximum clearance between rod, lamp and housing within above-stated limits. Due to the close clearance uniformly along the lengths of pump lamp 4 and around it, heat transfer between pump lamp 4 and transparent housing 1 is facilitated. In flashlamps of ordinary structure, which are not precision ground but drawn to approximate dimensions, contact between housing 1 and exterior of the flashlamp envelope could best be described as point contact. Such point contact results in relatively higher heat transfer at the point of contact, and relatively lower heat transfer in the remaining portions. Consequently, thermal gradients are set up in the housing along its lengths, resulting in localized heating and consequent distortion of the laser rod. Temperature gradients tend to become larger at increasing heat loads on the housing, thereby limiting the power input that can be handled by the laser under given cooling conditions. The close precision fit between the pump lamp 4 and transparent housing 1, which is an important element of the present invention, reduces thermal gradients, with consequent improved reliability of laser operation and enhanced beam quality. It also permits lasing at increased power levels and at higher repetition rates. Precision fit between pump lamp 4 and housing 1 avoids need for special heat transfer compounds between pump lamp and housing (see e.g., U.S. Pat. No. 4,637,028 to Kahan).

With reference to FIG. 2, the improved unitary solid-state laser of the present invention may further incorporate means for shielding the laser beam from thermal air gradients in the vicinity of the housing, which gradients may lead to distortion of the beam. Conveniently, these means may take the form of beam tubes 12 provided as an extension of laser rod bore 3, as shown in FIG. 2. Beam tubes 12 serve to eliminate thermal air gradients in the laser beam path. Addition of beam tubes 12 reduces the fluctuations in the laser pulse energy and improves the overall stability of the laser. Beam tubes 12 can be constructed of any suitable material, e.g., glass or metal, and should be suitably fitted to permit unobstructed passage of the laser beam. They serve to eliminate optical distortion caused by the radiated heat from the flash lamp electrodes by interrupting the flow of heated air within the path of the beam of coherent radiation 13. To that end, they should extend a suitable distance from the housing, sufficient to cover the region within which the ambient air is subjected to heating by the electrodes.

Figure 5:
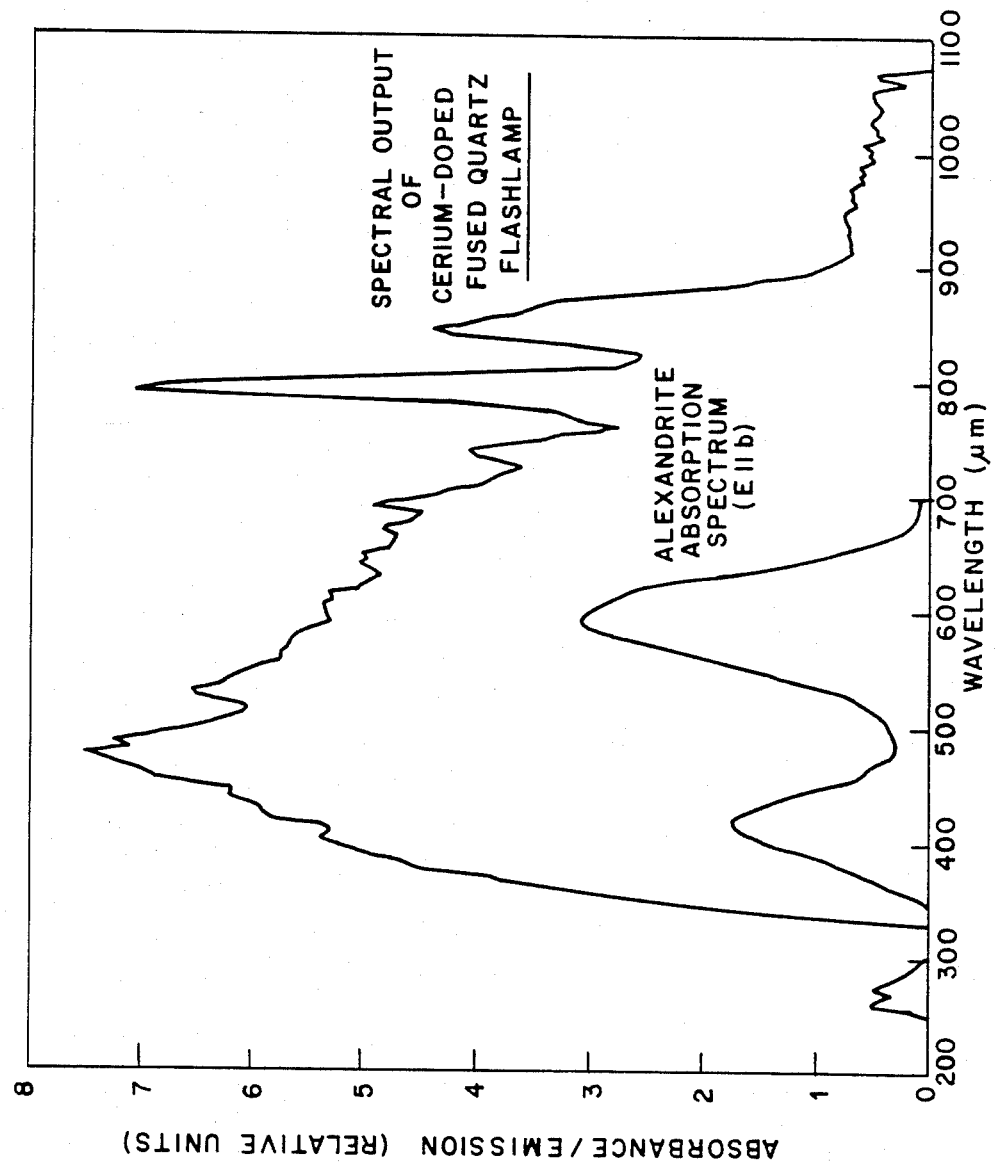
FIG. 5 shows superimposed the alexandrite absorption spectrum and the spectral output of a cerium doped fused quartz flashlamp.
Figures 6A, 6B:
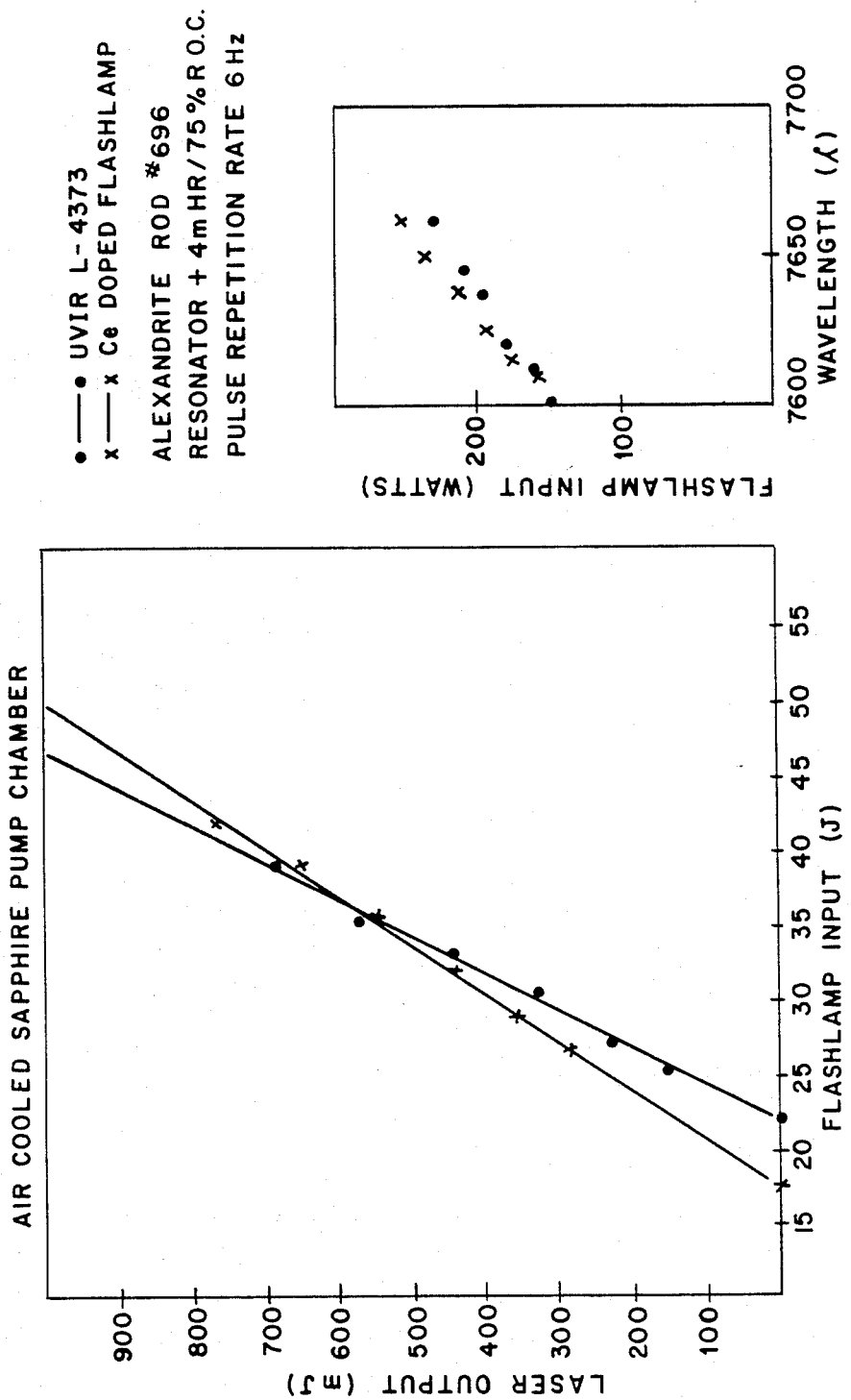
FIG. 6 shows the comparative laser output of an alexandrite laser in an air cooled sapphire pump chamber pumped with a cerium doped fused quartz flashlamp and with an ordinary flashlamp having an UV and IR reflective surface coating.

Use of pump lamps having an envelope of cerium doped fused quartz, with precision ground exterior surface as above described, provides laser performance comparable to that provided by a flashlamp having a coating with high reflectivity in the infra-red and ultraviolet regions, with high transmission in the 400 to 700 nm spectral region as described in U.S. application Ser. No. 062,940, filed June 16, 1987 by Morris et al. for Unitary Solid-State Laser. As described in said application, the UV and IR reflective coatings block specific wavelength radiation of the type which can lead to laser rod solarization, hence, permit operation at higher power levels and improved efficiency as compared to an uncoated, undoped flashlamp. Spectral output of a cerium doped fused quartz flashlamp (superimposed on the alexandrite absorption spectrum) is shown in FIG. 5. Spectral output of the flashlamp shows an optical window in the 220 to 300 nm region which could cause solarization of the laser rod. Laboratory tests which we have conducted, measuring the laser performance using a cerium doped flashlamp, have shown that this window does not cause solarization, and that the cerium doped flashlamps perform comparable to coated flashlamp carrying a UV and IR reflective coating (see FIGS. 6 and 7). Cerium doped fused quartz flashlamps are commercially available at standard surface quality (see, e.g., Technical Bulletin 3 of ILC Technology 399 Java Drive, Sunnyvale, Calif. 94089). Precision grinding as above disclosed is available only on specific request.

In a specific embodiment, a precision ground flashlamp having an envelope of cerium doped fused quartz is precision ground to a diameter of 0.323 ±0.001". This flashlamp is clamped in a split sapphire cavity whose tolerance is 0.326"±0.001". The flashlamp can be held in the channel by any desirable means, e.g., by a spring clamping arrangement that provides an interface which varies from 0 to 0.06 mm (maximally) along the radial direction. The use of clamping springs allows a cavity compensation for differential expansion between the fused quartz flashlamp and the sapphire housing. There is no need for special heat transfer compounds.

We claim:
1. An improved unitary laser comprising, in combination,
(a) a transparent, thermally conductive solid housing comprising a pair of semi-cylindrical sections joined at one surface to be movable between a first open position and a second closed position:

(b) a laser medium that has two opposite ends and is embedded over its total length in a first cavity in the housing which is defined by the housing, when the housing is in the second, closed position (c) a pump lamp for exciting the laser medium having an envelope and internal electrodes which pump lamp is embedded over the whole length of its arc and over a substantial length of each of its electrode regions in a second cavity in the housing, such that the external surface of the pump lamp and the internal surface of the second cavity are mated with a clearance there between of not more than about 0.1 millimeters: and (d) reflector means adjacent to the opposite ends of the laser medium that define an optical resonant cavity and support coherent radiation laser emitted by the laser medium.

2. The laser of claim 1 provided with means for shielding the laser beam from thermal air gradients in the vicinity of the housing.

3. The laser of claim 1 wherein the pump lamp has an envelope of cerium-doped quartz.

4. The laser of claim 1 wherein the pump lamp is embedded in the housing over the whole length of its arc and at least about one quarter of the length of each of its electrode regions.

5. The laser of claim 4 wherein the clearance between the pump lamp and the internal surface of the second cavity is not more than about 0.05 mm.

6. The laser of claim 5 wherein the pump lamp has an envelope of cerium-doped quartz.

7. The laser of claim 6 wherein the laser medium is alexandrite.

8. The laser of claim 6 wherein the laser medium is Nd:YAG.

9. The laser of claim 7 further comprising means for shielding the laser beam from thermal air gradients in the vicinity of the housing.

10. The laser of claim 1 wherein the pump lamp is embedded in the housing over the whole length of its arc and at least about half of the length of each of its electrode regions, wherein the clearance between the pump lamp and the internal surface of the second cavity is not more than about 0.05 mm, wherein the pump lamp has an envelope of cerium-doped quartz, and wherein the laser medium is alexandrite, said laser further comprising means for shielding the laser beam from thermal air gradients in the vicinity of the housing.

* * * * *